(12) United States Patent
Kobyakov et al.

(10) Patent No.: US 9,767,079 B1
(45) Date of Patent: Sep. 19, 2017

(54) SERVING EXPANDABLE CONTENT ITEMS

(71) Applicant: Google Inc., Mountain View, CA (US)

(72) Inventors: Pavel Kobyakov, Waterloo (CA); Fedor Labounko, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/376,493

(22) Filed: Dec. 12, 2016

Related U.S. Application Data

(63) Continuation of application No. 14/239,781, filed as application No. PCT/UA2012/000072 on Jul. 20, 2012, now Pat. No. 9,552,436.

(51) Int. Cl.
| | |
|---|---|
| *G06F 17/00* | (2006.01) |
| *G06F 17/21* | (2006.01) |
| *G06F 17/22* | (2006.01) |
| *G06F 17/27* | (2006.01) |
| *G06Q 30/02* | (2012.01) |
| *G06F 17/30* | (2006.01) |

(52) U.S. Cl.
CPC ........ *G06F 17/212* (2013.01); *G06F 17/2247* (2013.01); *G06F 17/2705* (2013.01); *G06Q 30/0277* (2013.01); *G06F 17/3089* (2013.01)

(58) Field of Classification Search
None
See application file for complete search history.

(56) References Cited

U.S. PATENT DOCUMENTS

| | | | | |
|---|---|---|---|---|
| 6,324,519 | B1 * | 11/2001 | Eldering | G06Q 30/02 705/14.65 |
| 7,895,077 | B2 * | 2/2011 | Anand | G06Q 30/02 705/14.42 |
| 8,225,198 | B2 * | 7/2012 | Hanechak | G06F 17/2229 715/240 |
| 2004/0260767 | A1 * | 12/2004 | Kedem | G06Q 30/02 709/203 |
| 2004/0268299 | A1 * | 12/2004 | Lei | G06F 9/4443 717/106 |
| 2008/0141172 | A1 * | 6/2008 | Yamamoto | G06F 3/0482 715/835 |
| 2009/0010154 | A1 * | 1/2009 | Martinotti | H04L 12/1877 370/228 |

(Continued)

OTHER PUBLICATIONS

US Notice of Allowance on U.S. Appl. No. 14/239,781 dated Oct. 25, 2016.

(Continued)

*Primary Examiner* — Mustafa Amin
(74) *Attorney, Agent, or Firm* — Foley & Lardner LLP; John D. Lanza

(57) ABSTRACT

Systems and methods for displaying expandable content by maintaining a content database of slot identifier entries, each entry identifying a respective content slot and a respective resource identifier of a corresponding electronic publication on which the respective content slot is positioned. A data processing system receives a request to provide content for a content slot, the request identifying a slot identifier and a resource identifier, and determines, by accessing the content database, one or more permitted expansion directions for the content slot. The data processing system selects an expandable content item for publication based on the one or more determined permitted expansion directions.

20 Claims, 4 Drawing Sheets

(56) References Cited

U.S. PATENT DOCUMENTS

| | | | | |
|---|---|---|---|---|
| 2009/0204887 | A1* | 8/2009 | Chakra ................... | G06F 17/30 715/243 |
| 2009/0299862 | A1* | 12/2009 | Fan .................... | G06Q 30/0277 705/14.73 |
| 2010/0313129 | A1* | 12/2010 | Hyman ............. | G06F 17/30905 715/719 |
| 2011/0153435 | A1* | 6/2011 | Pisaris-Henderson . | G06Q 30/02 705/14.73 |
| 2011/0161990 | A1* | 6/2011 | Smith ............... | G06F 17/30861 719/328 |
| 2012/0101907 | A1* | 4/2012 | Dodda ............... | G06Q 30/0277 705/14.73 |
| 2012/0278704 | A1* | 11/2012 | Ying ................... | G06F 17/2247 715/243 |
| 2014/0164923 | A1* | 6/2014 | Georgiev .............. | G06F 3/0485 715/716 |
| 2015/0220990 | A1* | 8/2015 | Kobyakov ......... | G06Q 30/0241 705/14.6 |

OTHER PUBLICATIONS

US Office Action on U.S. Appl. No. 14/239,781 dated Jul. 13, 2016.

* cited by examiner

SERVING EXPANDABLE CONTENT ITEMS

RELATED APPLICATIONS

The present application claims priority as a continuation application under 35 U.S.C. §120 to U.S. patent application Ser. No. 14/239,781, filed Aug. 25, 2014, which in turn is a National Stage of PCT/UA2012/000072 filed Jul. 20, 2012, contents of which are hereby incorporated by reference in their entirety.

BACKGROUND

This disclosure relates to information presentation.

Publications (e.g., electronic publications, websites, etc.) may include third party content items (e.g., advertising), for example, to financially support a resource provider's (e.g., website publisher) operations. Some resource providers do not maintain a third party content infrastructure, and thus depend on content serving entities to recruit third party content sponsors and to serve the content items. Content serving entities can maintain data about user traffic viewing content, and user interaction with served content. Typically, a served content item occupies a predefined portion of a publication, or slot.

SUMMARY

This disclosure describes, among other things, systems and methods for selecting and serving expandable content items.

One aspect of the subject matter described in this specification can be implemented on a computer system. Information regarding slots associated with one or more publications (e.g., webpages) can be received from a resource provider. Properties for each of the slots can be determined including determining expansion information (e.g., expansion directions.) Expandable content items, such as expandable advertisements, can be selected for publishing from one or more candidate expandable content items based, at least in part, on the expansion information of the slot.

In some implementations, each slot includes associated slot information. The associated slot information can be associated with a resource locator of the one or more publications and the associated slot information can include slot identifier information and content format information. The slot information and resource locator can be further associated with the determined slot properties. In some implementations, one or more uni-directional expandable content items having associated expansion information can be received from a content sponsor. The expansion information can include directional indicator information. In some implementations, the determined slot properties include slot location, slot size, and page document size. In some implementations, the slot properties are determined after one or more publications, such as webpages, are fully rendered.

Particular embodiments of the subject matter described in this specification can be implemented to realize none, one or more of the following advantages. Content sponsors and resource providers can, among other things, present expandable content items while reducing undesirable effects, such as clipping or shifting of publication content. Content sponsors can offer uni-directional expandable content items instead of complex multi-directional expandable content items thereby obviating the need for logic for determining a best possible expansion direction once the content item has been loaded on the publication.

Additionally, the slot position can be detected automatically and content sponsors or resource providers need not become involved in defining slot positions and content item expansion directions to ensure that expandable content items expand in the desired directions.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
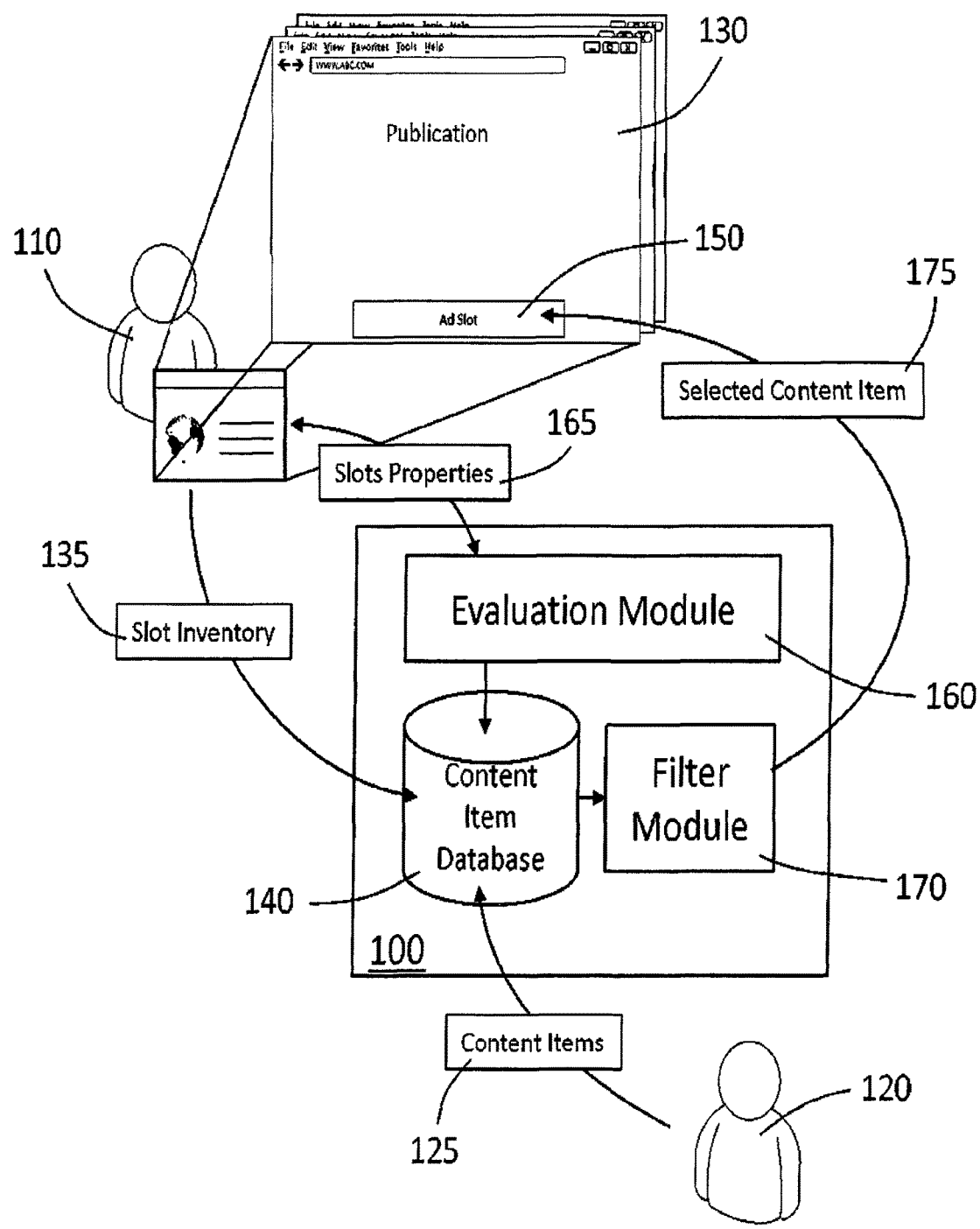
FIG. 1 shows an example of a content item selection system for expandable content items.

Information regarding slots associated with one or more publications (e.g., webpages) can be received from a resource provider. Properties for each of the slots can be determined including determining expansion information (e.g., expansion directions.) Expandable content items, such as expandable advertisements, can be selected for publishing from one or more candidate expandable content items based, at least in part, on the expansion information associated with a given slot.

Content items, such as advertisements, can be placed in slots that are made available by a resource provider, such as a website publisher, for publication. A publication can be, for example, an electronic publication or a website. A website can be a collection of related webpages containing text, images, videos, or other assets. The resource provider can define a number of slots to appear on the resource provider's publication. For example, slots can appear on multiple of the resource provider's publications in different positions and be of different sizes or be configured to support different types of content. Expandable content items can be of the form of executable objects, such as HTML objects, a JavaScript object, an ActionScript object, or any combination of these or other executable objects.

Some expandable content items are "uni-directional," meaning that the expandable content item can expand only in one direction, such as "down", "up", "left", or "right." In contrast, multi-directional expandable content items are designed such that expansion in two or more directions is supported. In some implementations, content sponsors can designate their content items as expandable content items (e.g., through a user interface) including possible expanding directions (e.g., not expandable, up, down, left, right, or any combination thereof).

An expandable content item can be presented in a slot on a resource provider's publication presenting content to a viewer initially in a non-expanded, original state. A viewer, as described herein, is an individual or group accessing and viewing publications. In response to a viewer initiated action, such as moving a cursor over the expandable content item or a mouse click on a control, the expandable content item can expand to its expanded presentation state (e.g., beyond its original size), for example by rendering an expanded view of the content item. Consequently, expandable content items create more space for the content sponsor to present information, for example about a product or service and potentially will result in more interaction from interested viewers, thus, providing more benefit to the interested viewers.

The expansion can be temporary and the expandable content item may revert back to its original non-expanded state either automatically, after a predetermined amount of time, or once the viewer initiates further action, such as moving the cursor off the expandable content item, clicking on a "close" button within the expanded content item, or clicking on any location of the publication outside the expanded content item. Expandable content items can be used, for example, for streaming a movie trailer, showing video game clips, or displaying various views of an item for sale.

Expandable content items may require additional space for expansion and can be constrained by the location of the respective slot the expandable content item is placed into relative to the viewport (e.g., a visible portion of a canvas), page boundaries, or other page content. For example, when a slot is located at or near the top of a webpage, it may not be desirable for the expandable content item to expand 'up', because the expandable content item could be cut off, or when a slot is located at or near the bottom of a webpage, it may not be desirable for the expandable content item to expand 'down', because the expandable content item could shift the webpage content. Thus, it is desirable to determine the permitted expansion directions for slots before expandable content items are placed into the respective slots. One form of content items that can be delivered is expandable advertisements.

FIG. 1 shows an example content item selection system 100 for expandable content items. The content item selection system 100 can be operated in a network environment, such as the Internet or a local area network, which may include server and client systems. For example, a resource provider 110 can be a publishing server, and a content sponsor 120 can be a content sponsor server, both of which are communicatively coupled to the content item selection system 100 through one or more communication channels. The servers in the network can be set up in many different configurations and are described further below. The communication channels can include wired or wireless channels, one or more internal computing system buses, one or more computer networks, or any combinations thereof. The resource provider 110 can be configured to store and serve publications 130, such as webpages, in response to requests received through the communication channels of the network from other devices, such as the client systems.

Client systems can be used by viewers to access the World Wide Web and view webpages or other content, for example, that are published by the resource provider 110. The client systems can include user interface devices, such as input/output devices (e.g., a display, touchscreen, keyboard, and a mouse), and computers that can be separate from the user interface devices (e.g., server computers accessible over a network or desktop personal computers) or integrated with the user interface devices (e.g., a laptop computer, tablet device, smart phone, set top device or other electronic device having a processor and user interface included therein). The network can be or may include the Internet and the number of servers and/or clients connected to the network is not limited by this disclosure.

In some implementations, the resource provider 110 can make slot inventory 135 available for the placement of content items 125, offered by content sponsors 120, on the resource provider's publication 130. The slot inventory 135 can be provided to the content item selection system 100 and stored in a content item database 140. The content item database 140 can be an offline or online storage medium. The slot inventory 135 can include slots 150 that are located on the resource provider's publication 130.

For ease of explanation, a single slot 150 is shown in FIG. 1, but the slot inventory 135 can include multiple slots 150 on multiple publications 130 at different locations and be of different sizes or types. The slot inventory 135 stored in the content item database 140 can include slot information associated with individual or multiple slots, and can include a slot id, slot size, and content format or type information. The content format can, for example, include designations for permissible or desired text color, rendering, or media type for the respective slot 150. The slot information can be stored along with the associated slot of the slot inventory 135 in the content item database 140.

In some implementations, a resource provider 110 can request content items 125 from the content item selection system 100, for example by adding script tags defining a slot to the publication 130. A script tag can define the slot information (e.g., slot id, slot width, and slot height.) Slots (e.g., inline frames or 'iframes') for hosting the content items 125 can be created on the publication 130. The slot information can be stored in a global map, such that the slot information is accessible for later evaluation of the publication 130.

The content item selection system 100 can include an evaluation module 160 and a filter module 170. The evaluation module 160 processes (e.g., retrieves and receives) slot properties 165 for the slot inventory 135 stored in the content item database 140. The slot properties 165 can include, for example, slot location, slot size (e.g., width and height), publication document size of the resource provider's publication 130, and permitted expansion directions for expandable content items.

In some implementations, slot properties 165, such as slot size, slot location, and publication document size can be determined by running a script (e.g. based on JavaScript) on the publication (e.g., a webpage). The script can be invoked, for example, by the viewer's web browser. With the slot information stored in the global map, the script can identify all slots created for the publication and determine slot properties 165, such as slot position and slot size. The permitted expansion directions for each slot can be determined based on the respective slot size, slot location and publication document size. Multiple slots on a publication can be of the same size and support the same expansion directions. In some implementations, different evaluation mechanisms (e.g., based on JavaScript) can be used to cover a variety of script tags supported on a respective delivery system (e.g., DFP adi/adj, GDN, GAM, etc.).

The content item selection system 100 associates the slot properties 165 with the respective slot 150 of the slot inventory 135. When a content item 125 is requested to fill the slot 150, the filter module 170 can select a content item 175 from the content item database 140 that is suitable for presentation on the resource provider's publication 130, based on the slot properties 165 of the slot 150. In some implementations, a resource provider 110 can further restrict content items 125 by defining criteria (e.g. through a user interface) associated with the slots. Amongst other criteria, the resource provider 110 can restrict content items 125 based on content, style, expansion directions, and other attributes related to the slot.

In some implementations, the content selection system 100 can provide a preview option to allow reviewers of expandable content items presented on a resource provider's publication 130 to verify that expandable content items properly expand. The preview can be rendered on publications that are separate from the resource provider's publication 130, for example by using a static preview content service.

Figure 2:
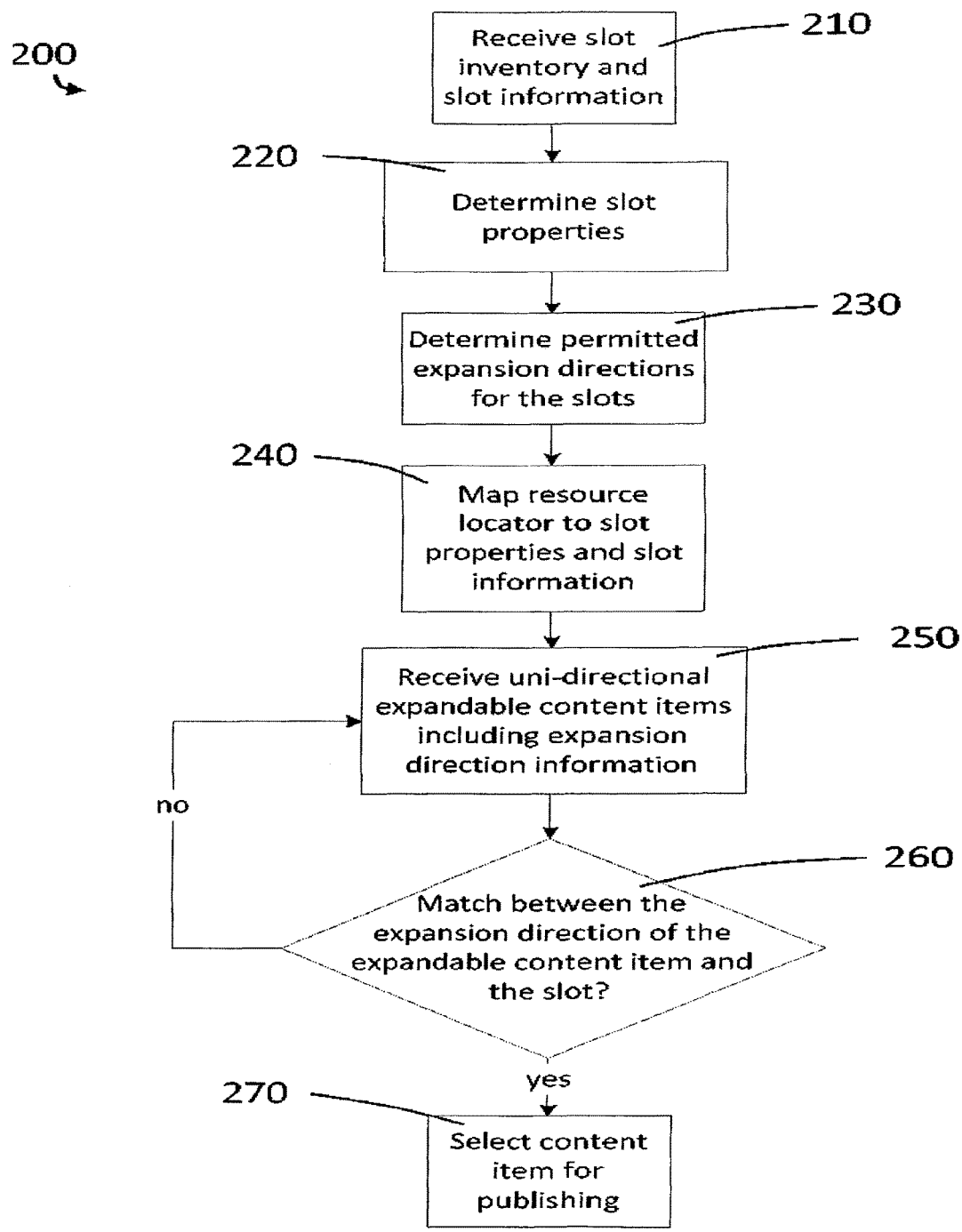
FIG. 2 shows an example of a flow diagram for selecting expandable content items.

FIG. 2 shows an example process 200 for selecting expandable content items for presentation on the resource provider's publication 130. In some implementations, the process begins when slot inventory and slot information 210 is made available by the resource provider 110. The slot inventory and slot information 210 can include multiple slots distributed between several of the resource provider's publications 130. The resource provider 110 can define slot information for each slot, such as a slot id, slot size, text color, rendering, media type, etc., which can be associated with each respective slot. Slots on different publications 130 can have the same associated slot information.

The evaluation module 160 can detect slots located on each of the resource provider's publications 130 and slot properties for the detected slots can be determined 220, for example, by evaluating (e.g., measuring) the resource provider's publications 130 as described above. In some implementations, the evaluation of the slots is performed after complete rendering of the respective publication 130. The slot properties can include slot position, size, and publication document size (e.g., viewport) of the specific publication 130 including the slot. The slot detection and evaluation process can be manually initiated or automated for the resource provider's publication 130.

In some implementations, slot measurements that are taken on a publication can be collected and statistically analyzed to form predictions for future placement of expandable content items on the publication. Because slots on a particular publication may not change very frequently, forming such content item placement predictions can reduce the re-evaluation activity of the slots on a publication for future content item placement, and thus, may reduce system resources required for the evaluation process.

In some implementations, based at least in part on the location and size of a slot, and the page document size, permitted expansion directions for expandable content items are determined 230. In some implementations, a predefined policy entry defines a maximum size for an expanded content item representation, for example, an expandable content item may be limited to expand by a maximum factor of three (e.g. original size 728×90, expanded size in one direction 728×270). A check can be made during the evaluation of the slots to ensure that the required (or maximum) expansion space is available in the determined expansion direction. For example, if the evaluation process indicates that slot 1 is at the bottom of a webpage, a possible expansion direction would be 'up', but not 'down'.

Additionally, with respect to the above example, expansion to the 'right' and/or 'left' may also be possible dependent on the alignment and width of the slot, and the width of the page. In some implementations, permitted expansion directions are associated with a slot where maximum expansion of an expandable content item would be possible. For example, if a predefined policy allows for maximum expansion in every direction of three times the original content item size, only expansion directions that ensure proper display of the fully expanded content item are associated with the respective slot. In some implementations, expansion directions may be associated with a slot even if less than full expansion is possible, and candidate expandable content items with an expansion size less than the maximum expansion size of the particular slot can be identified for presentation.

In some implementations, the slot information, which may include a slot id, and a resource locator (e.g., a uniform resource locator (URL)) can be associated with permitted expansion directions 240. The combination of the resource locator and the slot id creates a unique identifier for each slot, which can be particularly important in implementations where a resource provider 110 recycles the same slot id for slots on several of the resource provider's publications 130, and where the locations of the respective slots vary on the different publications. Because the slots with the same slot id can be located at different positions on the respective publication, the permitted expansion direction may vary for these slots, even if the slots are associated with the same slot id. Thus, the unique identifier allows for selection of content items that expand in a permitted direction based on the particular location of the slot being filled.

For example, a slot with a slot id 1 can be at the bottom of publication 1 and a slot with the same slot id 1 can be at the top of publication 2, thus, the permitted expansion directions 230 are different for the slot with id 1 on either publication. The resource locator (e.g., a URL) of publication 1 and publication 2 are different however, thus, the combination of slot id and resource locator is unique. The unique identifier ensures that each slot is properly matched with the permitted expansion directions.

In some implementations, the slot information and slot properties can be stored along with the associated resource locator and the permitted expansion directions in a database, such as content item database 140. At runtime, the database can be consulted to determine expansion directions applicable to each incoming content item request. The content item selection system 100 can be configured to automatically serve content items in response to incoming requests and in some implementations the process can be performed substantially in real time.

Expandable content items can be received from a content sponsor or content item designer. In some implementations, the expandable content items include information regarding an expansion direction 250. An expandable content item can be uni-directional, where expansion is only possible in one direction, for example, 'up', 'down', 'left', or 'right'. The content sponsor or content item designer can define the expansion direction for the uni-directional expandable content item. The expansion direction of the uni-directional content item can be compared to the permitted expansion direction of a slot 260 and if the expansion direction of the uni-directional content item matches a permitted expansion direction of the slot, the uni-directional content item can be selected for publishing 270.

In some implementations, a uni-directional expandable content item can be selected for publishing, if, amongst other things (e.g., size, format, target audience, and other criteria), the permitted expansion direction of the slot 230 matches the possible expansion direction of the uni-directional expandable content item 250. For example, a uni-directional expandable content item 250 with an expansion direction 'up' can be placed in a slot located at the bottom, but not in a slot located at the top, of a publication.

Figure 3:
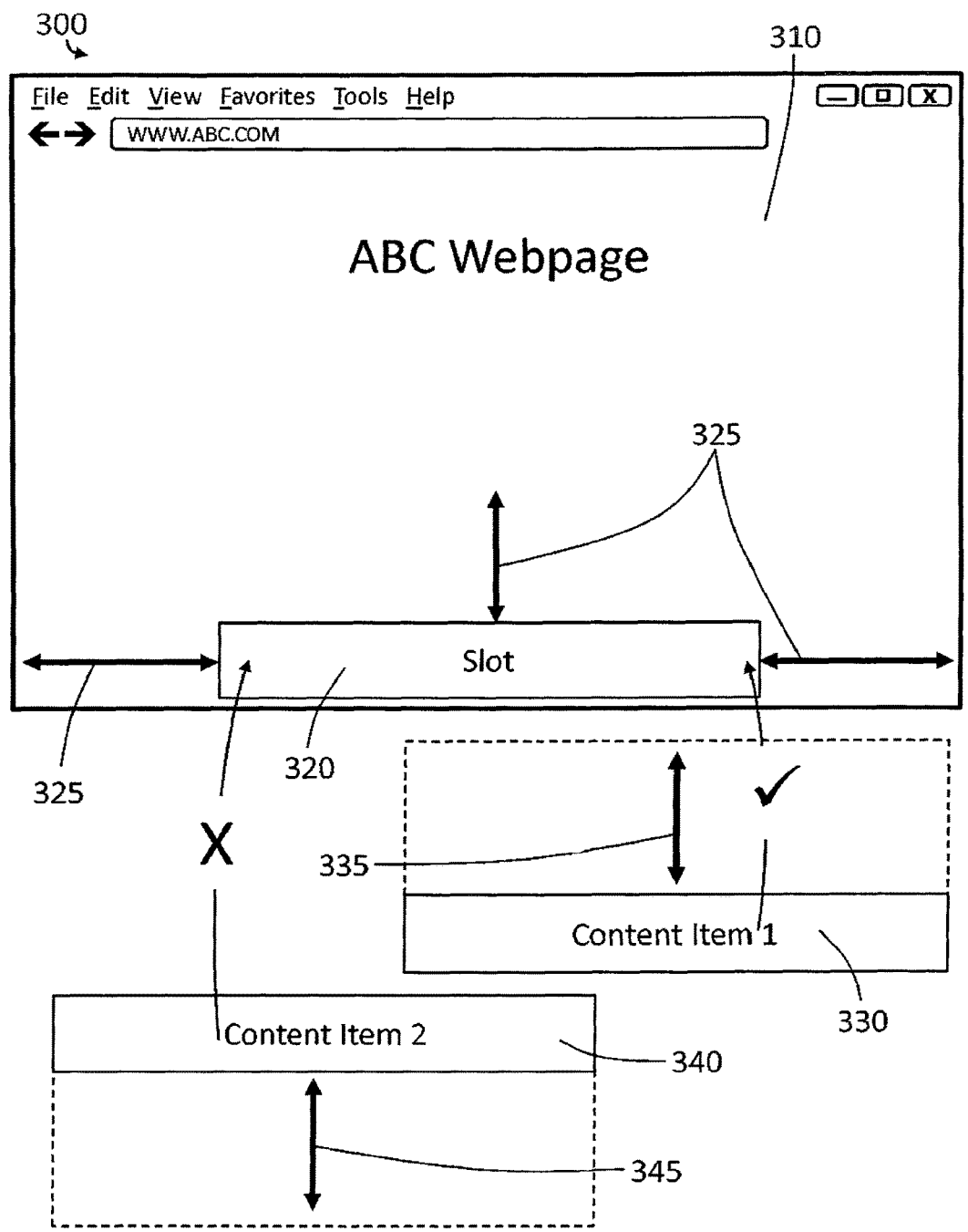
FIG. 3 shows an example flow for serving and displaying uni-directional expandable content items.

FIG. 3 shows an example publication 300 associated with serving and displaying uni-directional expandable content items. In this example, a webpage 310 includes an available slot 320, which supports expandable content items, located at the bottom and horizontally centered on the webpage 310. The slot 320 has been evaluated according to the above-described process and the permitted expansion directions 325 for the slot 320 have been determined. In this example, the slot 320 allows for expansion 'up', 'left', and 'right'. In some implementations, the permitted expansion directions may be defined based on other criteria, such as viewport extent, display (e.g., visible display portion based on resolution), browser attributes, or content of the expanded portion of the expandable content item. The permitted expansion directions can be stored along with the slot information and slot properties in a database.

In this example, a content sponsor provides two uni-directional expandable content items for publishing, including expansion information (e.g., directions for expansion for each of the uni-directional content items). For example, uni-directional expandable content item 330 was designed for the expansion direction 'up' 335 and uni-directional expandable content item 340 was designed for the expansion direction 'down' 345 In some implementations, expandable content items 330 and 340 can be the same content item with possible expansion directions of 'up' and 'down'. At serving time the expansion directions 335 and 345 of the uni-directional expandable content items 330 and 340 respectively can be matched with the permitted expansion direction 325 of the slot 320. In this example, expandable content item 330 with the expansion direction 'up' 335 matches the permitted candidate expansion direction 325 of the slot 320 and thus can be selected for publishing. Expandable content item 340 will be filtered out since the expansion direction 'down' does not match any of the permitted expansion directions 325 of the slot 320.

As described above, expandable content items that cannot be completely shown based on the slot position and permitted expansion directions can be filtered. This can include partial matches for multi-directional content Items. For example, if an expandable content item can expand in the directions 'right' or 'left', and a slot allows for expansion directions 'down' or 'right', the expandable content item may be permissible since it can expand 'right' in the slot. If however an expandable content item can only expand 'left', it would be filtered. In some implementations, multi-directional expandable content items can be configured to provide functionality supporting the selection of their expansion direction based on the permitted expansion directions of the slot at the time the publication is rendered. In some implementations, a content sponsor or content item designer can create two or more expandable 'uni-directional' content items from one multi-directional expandable content item by defining one expansion direction for each version of the multi-directional expandable content item.

In some implementations, more than one expandable content item of a content item inventory can match the permitted expansion directions of a slot. Where more than one match occurs, various means can be used to select a content item for presentation. For example, one of the candidate matching expandable content items can be selected based on a quality score, randomly, or using a predefined selection criteria. In some implementations, other selection criteria can be used to further filter the content items, such as criteria related to content, format, size, bid amount, budget, auctions, historical campaign information, performance (e.g., measured by user interaction translated as content item expansion rates), capabilities, relationships between resource provider and content sponsor, compensation models, or any other selection criteria resource providers and content sponsors may define for presentation.

The following description of a specific selection process serves as an example for various implementations and not as limiting the claimed subject matter. A publisher's webpage includes, for example, a slot with a slot id '123'. An evaluation (e.g., measurement) process as described above evaluates (either actively or by retrieving stored evaluation information) the webpage including the slot with the id '123'. In one example, the evaluation process can return the following results: the slot is '123', a size of 728×90, location is at coordinates 10,100, and the page document size is 1000×800. With the results, the permitted expansion directions can be determined. In this example, the coordinates 10,100 define the slot as being located near the upper left corner of the page, thus a permitted expansion direction would be 'down' or 'right', but not 'up'. An entry in the content item database can be recorded for slot '123', including the slot size 728×90, slot location 10,100, page document size 1000×800, and permitted expansion directions 'down' or 'right'.

Content sponsors can provide content items to the selection system and in this example, two candidate uni-directional expandable content items, content item 1 and content item 2, with an unexpanded size 728×90 are identified. Content item 1 is designed to expand 'up' and content item 2 is designed to expand 'down'. At request time the permitted expansion directions for slot '123' are matched with the expansion directions of the uni-directional expandable candidate content items 1 and 2. In this example, content item 1 is filtered out, because it is designed to expand 'up' and slot '123' does not permit this expansion direction. The expansion direction of content item 2 matches the permitted expansion direction 'down' of slot '123', and thus, is selected for publishing.

Figure 4:
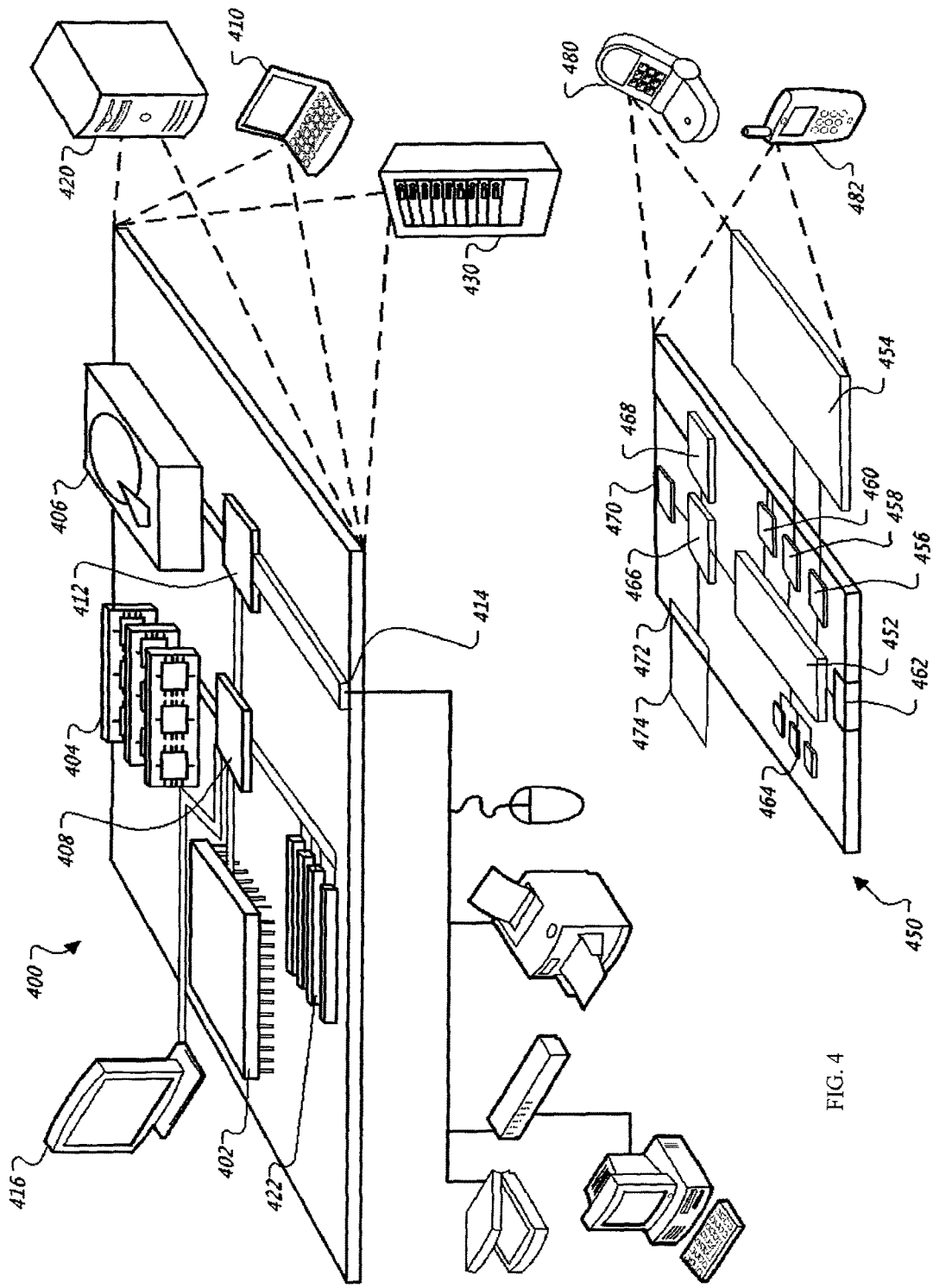
FIG. 4 shows an example of a computer device and a mobile computer device that can be used to implement the technologies described herein.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 422, and a low speed interface 412 connecting to low speed bus 414 and storage device 406. Each of the components 402, 404, 406, 408, 422, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 422, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 430. In addition, it may be implemented in a personal computer such as a laptop computer 410. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method for displaying expandable content comprising:
   maintaining, by a data processing system, a content database including a plurality of entries, each entry including a respective slot identifier identifying a corresponding content slot and a respective resource identifier identifying a corresponding electronic publication on which the respective content slot is positioned;
   receiving, by the data processing system, a request to provide content, the request identifying a slot identifier corresponding to a content slot in which to provide the content and a resource identifier identifying an electronic publication on which the content slot is positioned;
   determining, by the data processing system, by accessing the content database, one or more permitted expansion directions for the content slot using the slot identifier and the resource identifier; and
   selecting, by the data processing system, an expandable content item for publishing on the content slot of the electronic publication based on the one or more determined permitted expansion directions.

2. The method of claim 1, wherein selecting the expandable content item comprises:
determining, by the data processing system, an expandable direction of the expandable content item; and
matching the one or more permitted expansion directions with the expandable direction of the expandable content item.

3. The method of claim 1, wherein each entry of the content database further includes a slot property that is mapped to a respective slot identifier and that identifies one or more of a location of a content slot on an electronic publication, a size of a content slot, or a size of an electronic publication on which a content slot is positioned.

4. The method of claim 3, wherein determining the one or more permitted expansion directions for the content slot comprises:
identifying, by the data processing system, by accessing the content database, a slot property of the content slot using the slot identifier; and
determining, by the data processing system, the one or more permitted expansion directions based on the slot property of the content slot.

5. The method of claim 3, further comprising:
transmitting, by the data processing system, a script to a client device, the script configured to parse electronic publications to identify content slot properties of content slots of electronic publications displayed at the client device; and
receiving, by the data processing system, from the client device, a slot property of a content slot of an electronic publication via the transmitted script.

6. The method of claim 5, wherein the script is configured to be executed by a web browser at the client device.

7. The method of claim 1, further comprising:
maintaining, by the data processing system, in the content database, a predefined policy defining a maximum expansion factor for expandable content items; and
limiting, by the data processing system, a size for display of the expandable content item based on the maximum expansion factor.

8. The method of claim 7, wherein the maximum expansion factor is three times an original size of the expandable content item.

9. The method of claim 7, wherein one of a height or a width of the size of the expandable content item is limited based on the maximum expansion factor.

10. The method of claim 1, wherein the electronic publication is a webpage.

11. A system for displaying expandable content comprising a processing circuit configured to:
maintain a content database including a plurality of entries, each entry including a respective slot identifier identifying a corresponding content slot and a respective resource identifier identifying a corresponding electronic publication on which the respective content slot is positioned;
receive a request to provide content, the request identifying a slot identifier corresponding to a content slot in which to provide the content and a resource identifier identifying an electronic publication on which the content slot is positioned;
determine, by accessing the content database, one or more permitted expansion directions for the content slot using the slot identifier and the resource identifier; and
select an expandable content item for publishing on the content slot of the electronic publication based on the one or more determined permitted expansion directions.

12. The system of claim 11, wherein selecting the expandable content item comprises the processing circuit being further configured to:
determine an expandable direction of the expandable content item; and
match the one or more permitted expansion directions with the expandable direction of the expandable content item.

13. The system of claim 11, wherein each entry of the content database further includes a slot property that is mapped to a respective slot identifier and that identifies one or more of a location of a content slot on an electronic publication, a size of a content slot, and a size of an electronic publication on which a content slot is positioned.

14. The system of claim 13, wherein determining the one or more permitted expansion directions for the content slot comprises the processing circuit being further configured to:
identify, by accessing the content database, a slot property of the content slot using the slot identifier; and
determine the one or more permitted expansion directions based on the slot property of the content slot.

15. The system of claim 13, wherein the processing circuit is further configured to:
transmit a script to a client device, the script configured to parse electronic publications to identify content slot properties of content slots of electronic publications displayed at the client device; and
receive, from the client device, a slot property of a content slot of an electronic publication via the transmitted script.

16. The system of claim 15, wherein the script is configured to be executed by a web browser at the client device.

17. The system of claim 11, wherein the processing circuit is further configured to:
maintain, in the content database, a predefined policy defining a maximum expansion factor for expandable content items; and
limit a size for display of the expandable content item based on the maximum expansion factor.

18. The system of claim 17, wherein the maximum expansion factor is three times an original size of the expandable content item.

19. The system of claim 17, wherein one of a height or a width of the size of the expandable content item is limited based on the maximum expansion factor.

20. The system of claim 11, wherein the electronic publication is a webpage.

* * * * *